(12) United States Patent
Feenstra et al.

(10) Patent No.: US 9,086,565 B2
(45) Date of Patent: Jul. 21, 2015

(54) DISPLAY DEVICE

(75) Inventors: Bokke Johannes Feenstra, Eindhoven (NL); Robert Andrew Hayes, Eindhoven (NL); Ivo Godfried Jozef Camps, Eindhoven (NL)

(73) Assignee: Amazon Technologies, Inc., Reno, NV (US)

( * ) Notice: Subject to any disclaimer, the term of this patent is extended or adjusted under 35 U.S.C. 154(b) by 2048 days.

(21) Appl. No.: 11/816,716

(22) PCT Filed: Feb. 17, 2006

(86) PCT No.: PCT/IB2006/050528
§ 371 (c)(1),
(2), (4) Date: Aug. 21, 2007

(87) PCT Pub. No.: WO2006/090317
PCT Pub. Date: Aug. 31, 2006

(65) Prior Publication Data
US 2008/0204370 A1 Aug. 28, 2008

(30) Foreign Application Priority Data

Feb. 28, 2005 (EP) .................................... 05101497

(51) Int. Cl.
*G09G 3/28* (2013.01)
*G02B 26/00* (2006.01)
(52) U.S. Cl.
CPC .................................... *G02B 26/004* (2013.01)
(58) Field of Classification Search
CPC .............. G09G 3/2927; G09G 3/2022; G09G 2310/066; G09G 3/296; G09G 2360/16; G09G 3/2965; G09G 3/293

USPC ......... 359/296, 245, 252–254, 228, 462, 463, 359/666; 345/6, 32, 41, 48, 51, 55, 60, 82, 345/84, 97, 107, 204, 62, 63, 65; 349/1, 74, 349/84, 95, 144; 556/87, 465; 315/169.4

See application file for complete search history.

(56) References Cited

U.S. PATENT DOCUMENTS

| 5,181,016 A * | 1/1993 | Lee ................................. 345/84 |
| 2006/0132404 A1* | 6/2006 | Hayes et al. .................... 345/84 |

FOREIGN PATENT DOCUMENTS

| EP | 1310809 A2 | 5/2003 |
| WO | WO03000196 A2 | 1/2003 |
| WO | WO03071346 A1 | 8/2003 |

(Continued)

OTHER PUBLICATIONS

Hayes et al: "Video-Speed Electronic Paper Based on Electrowetting"; Nature, Nature Publishing Group, London, GB, vol. 425, No. 6956, Sep. 25, 2003, pp. 383-385, XP00286158.

(Continued)

*Primary Examiner* — Olga Merkoulova
(74) *Attorney, Agent, or Firm* — Lee & Hayes, PLLC

(57) ABSTRACT

A display device or optical switch, based on layer break up or layer displacement having at least two different states, in which one fluid, e.g. oil, in a first state adjoins at least a first support plate, and in a second state another fluid at least partly adjoins the first support plate. Sub-picture elements are separated by areas having a hydrophilic surface.

16 Claims, 4 Drawing Sheets

(56) References Cited

FOREIGN PATENT DOCUMENTS

| WO | WO2004068208 A1 | 8/2004 |
| WO | WO2004077124 A1 | 9/2004 |
| WO | WO2004104670 A1 | 12/2004 |
| WO | WO2006000945 A1 | 1/2006 |

OTHER PUBLICATIONS

Roques-Carmes et al: "Liquid Behavior Inside a Reflective Display Pixel Based on Electrowetting"; Journal of Applied Physics, American Institue of Physics, New York, vol. 95, No. 8, Apr. 15, 2004, pp. 4389-4396, XP012067801.

* cited by examiner

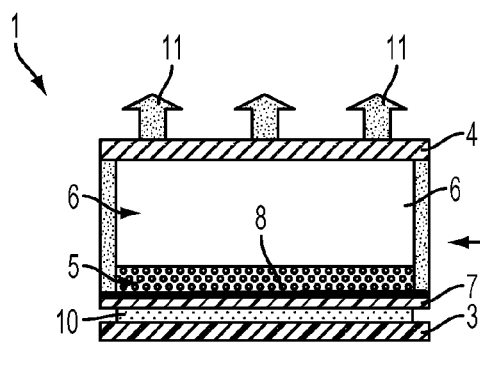
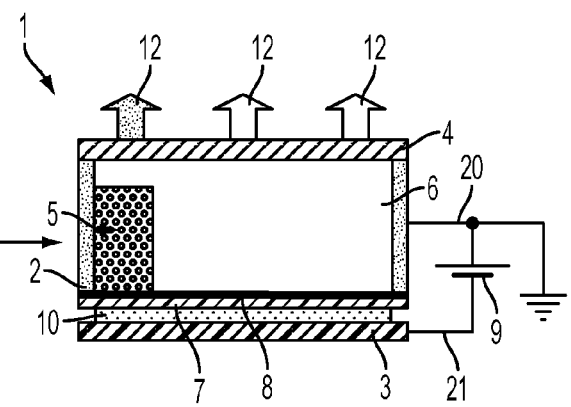
FIG. 1a
FIG. 1b
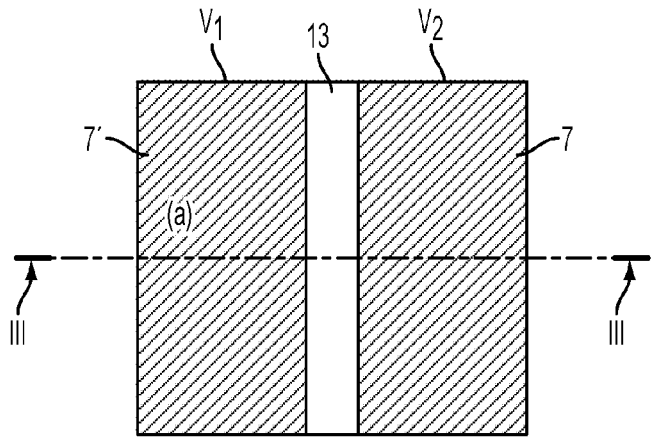
FIG. 2
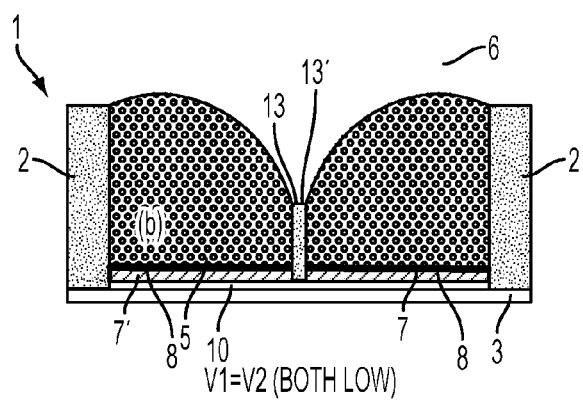
FIG. 3

DISPLAY DEVICE

BACKGROUND

The invention relates to a display device comprising picture elements, each picture element having at least one first fluid and a second fluid immiscible with each other within a space between a first support plate and a second support plate, the second fluid being electroconductive or polar.

Display devices like TFT-LCDs are used in laptop computers and in organizers, but also find an increasingly wider application in GSM telephones. Instead of LCDs, for example, (polymer) LED display devices are also being used.

Apart from these display effects that are well established by now other display techniques are evolving like electrophoretic displays, which are suitable for paper white applications.

More generally the invention relates to an optical switch comprising at least one first fluid and a second fluid immiscible with each other within a space between a first support plate and a second support plate, the second fluid being electroconductive or polar.

Optical switches may be used in shutter applications, diaphragms, but also in switchable color filters in e.g. display applications.

SUMMARY

The invention is based on a principle called electro-wetting. The invention provides new ways of using this principle in which one of the fluids in a first state adjoins a greater part of the first support plate and in the second state the other fluid at least partly adjoins the first support plate.

If for instance a (first) fluid is a (colored) oil and the second (the other) fluid is water (due to interfacial tensions) a two layer system is provided which comprises a water layer and an oil layer. However, if a voltage is applied between the water and an electrode on the first support plate the oil layer moves aside or breaks up due to electrostatic forces. Since parts of the water now penetrate the oil layer the picture element becomes partly transparent. When a (diffuse) reflector is positioned below the oil in or under the picture element a reflective display is realized.

Display devices based on this principle have been described in PCT-Application WO 03/00196 (PH-NL 02.0129). In all embodiments shown in this Application picture elements are described in which the picture element walls do not extend across the whole picture element thickness and in the second state the other fluid substantially completely adjoins the first support plate. Embodiments, not shown in this Application, where a picture element (pixel) can correspond to a defined space (e.g. a substantially closed space) are also possible.

Said display devices have low power consumption due to the low leakage current in the state when the voltage is applied. However, in some applications, such as an e-book, ultra-low power consumption is desired. Also an increasing need exists for reflective displays in these applications having intermediate transmission or reflection values (gray-values).

It is one of the objects of the present invention to overcome at least partly the above-mentioned problems.

To this end, according to the invention, the device is provided on a first support plate, within a picture area, with barriers separating the first fluid to define sub-picture elements, the first support plate comprising an electrode for each sub-picture element. If a barrier is incorporated within a picture element (pixel) that prevents oil motion without the application of a (local) voltage bi-stability is incorporated in the system, i.e. the optical state of the system is unchanged, even when the voltage is removed. In this way power consumption is reduced.

In a preferred embodiment the barriers comprise more wettable surfaces provided on walls.

One of the further advantages of bi-stability, next to the use of reduced power, is the possibility of obtaining gray-values by dividing the area of the picture element into different areas, be it that said method for obtaining gray-values in bi-stable display devices per se is known in the art.

A further preferred embodiment of the invention however offers the possibility of obtaining analogue gray-scales by applying to one of the electrodes pulsed high voltage, the pulse being shorter than the time required for the oil to move across the barrier entirely.

These and other aspects of the invention are apparent from and will be elucidated with reference to the embodiments described hereinafter.

BRIEF DESCRIPTION OF THE DRAWINGS

In the drawings:

FIG. 1 is a diagrammatic cross-section of a part of a display device, to show the principle on which a display device according to the invention is based, FIG. 2 is a plan view of a part of a display device according to the invention, while FIGS. 3-7 are diagrammatic cross-sections along line III-III in FIG. 2 at various driving conditions and FIGS. 8-11 are plan view of parts of other display devices according to the invention

DETAILED DESCRIPTION

Figure 4:
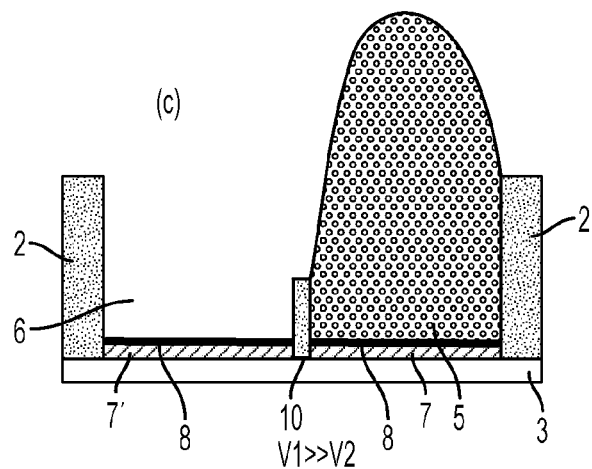
Figure 5:
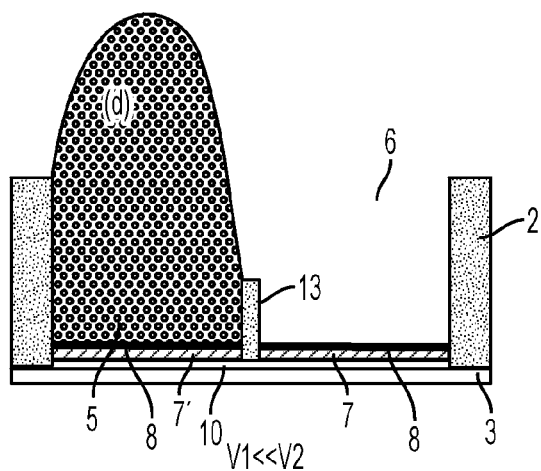

The figures are diagrammatic and not drawn to scale. Corresponding elements are generally denoted by the same reference numerals.

FIG. 1 shows a diagrammatic cross-section of a part of a display device 1, e.g. one picture element, which shows the principle on which a display device according to the invention is based. Between two transparent substrates or support plates 3, 4, and between pixel walls 2, a first fluid 5 and a second fluid 6 are provided, which are immiscible with each other. The first fluid 5 is for instance an alkane like hexadecane or as in this example, a (silicone) oil. The second fluid 6 is electroconductive or polar, for instance water or a salt solution (e.g. a solution of KCl in a mixture of water and ethyl alcohol). By means of a reflecting layer 10 positioned below the oil in this example below the transparent electrode 7, a reflective display picture element is realized.

In a first state, when no external voltage is applied (FIG. 1a) the fluids 5, 6 adjoin the first and second transparent support plates 3, 4 of e.g. glass or plastic. On the first support plate 3 the transparent electrode 7, for example indium (tin) oxide is provided and an intermediate less wettable (hydrophobic) layer 8, in this example an amorphous fluoropolymer (AF1600). Due to the presence of the oil over the whole area of the picture element appears black (arrows 11).

When a voltage is applied (voltage source 9) via interconnections 20, 21 the layer 5 moves aside or breaks up into small droplets (FIG. 1b). This occurs when the electrostatic energy gain is larger than the surface energy loss due to the creation of curved surfaces. In this case light is reflected at the main area of the picture element, while only a small part appears black (arrows 12).

FIG. 2 shows a plan view of a part of a display device according to the invention with the intermediate layer 8 removed for clarity, while FIGS. 3-7 show diagrammatic cross-sections along line III-III in FIG. 2. A further hydrophilic barrier or wall 13 is incorporated in a picture element that prevents oil motion in certain driving conditions.

The pixel walls 2 do not need to extend across the whole pixel thickness. The walls 2, 13 may be obtained by photolithography, offset printing or other printing techniques known in the art. The other reference numerals have the same meaning as those in FIG. 1.

The wall 13 in this example divides the picture element in two segments having equal size. In addition, the picture element comprises two electrodes 7, 7' of equal size that can be addressed individually. For said wall 13 (which is chosen to be as narrow as possible) a material is chosen such that it is hydrophilic, which implies that the oil 5 is prevented from wetting the barrier, particular from wetting the top of said barrier. The latter can be achieved by providing the top of the barrier or wall 13 with a more wettable surface 13'. At the same time it is chosen to be less hydrophilic than the material of the pixel walls 2. This has the effect that applying a voltage to either or both of the electrodes 7, 7' will cause the oil to move to one of the neighboring sub-picture elements. All voltages in the examples discussed below are chosen with respect to a ground potential applied to the second fluid 6.

In FIG. 3 the oil 5 is distributed evenly over both picture element parts. This is achieved when V1 (applied to electrode 7) and V2 (applied to electrode 7') are equal and both have a small magnitude.

Fixing the oil on the sides of the wall 13 is sufficiently strong to ensure separation of the two oil volumes. However, when either V1 or V2 is increased, at some point, the oil will want to wet the barrier, since at the area of the electrode having a higher voltage, the intermediate layer 8 becomes more hydrophilic than the wall 13 itself. As a result, the oil will move across the wall 13 to the other side, resulting in the situation sketched in FIG. 4 (V1>>V2) or FIG. 5 (V1<<V2).

Figure 6:
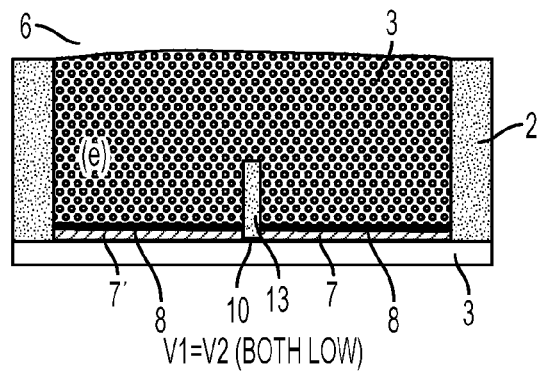

To reset the picture element in the fully dark state (the state where the oil is distributed evenly as shown in FIG. 6) a high voltage is applied to both sub-picture elements, such that the surface underlying the picture element becomes more hydrophilic than the wall 13. As a result, the oil 5 will move over the wall 13, and re-distribute itself over the entire picture element as in FIG. 6. Removing the voltage will split the oil layer at the wall 13, since this is now more hydrophilic than the surface underlying the picture element. The electrode configuration chosen here is merely an example. By choosing equal areas for the electrodes 7, 7' the situations of both FIG. 5 and FIG. 6 in fact have similar reflection (or transmission) properties, viz. mid-gray.

Figure 7:
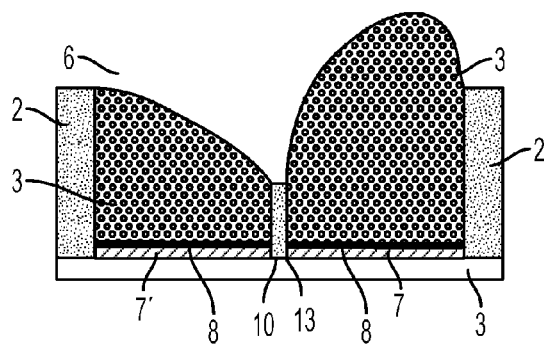

FIG. 7 shows how stable gray values in an analogue grayscale are obtained by using timing. If in the situation shown in FIG. 3 a pulsed high voltage is applied to one of the electrodes 7, 7', the pulse being shorter than the time required for the oil to move across the wall 13 entirely, at the end state the oil film is thicker in one part of the picture element than in the other. Since the nominal thickness of the film is such that about 1% of the light is reflected, the reflectivity cannot be reduced much further in the part where the film has become thicker. However, the reflectivity of the part where the oil film has become thinner will be increased significantly, resulting in an overall increase of reflectivity of the picture element. Depending on the pulse length compared to the time it takes for the oil to move, stable gray-values in an analogue grayscale are obtained in this way.

The electrode configuration chosen here is merely an example. Other electrode configurations can be chosen, such as a circular geometry. The area of the two pixel parts can be different, resulting in multiple gray values.

Figure 8:
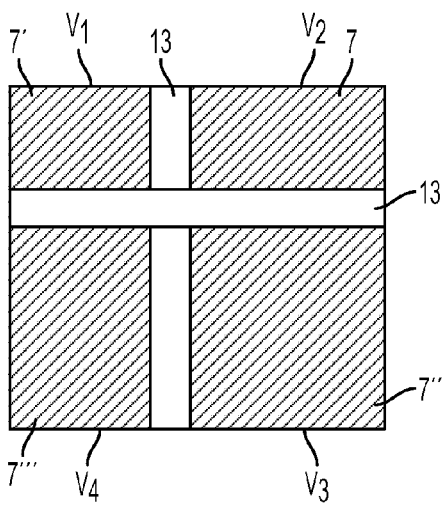
Figure 9:
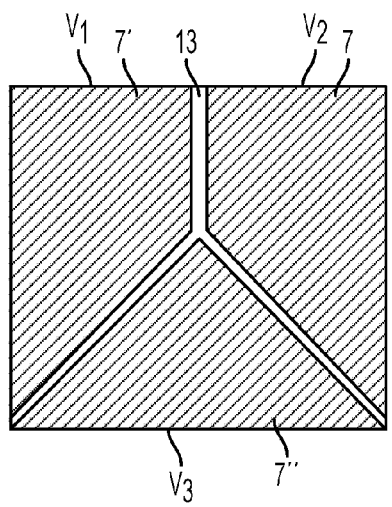
Figure 10:
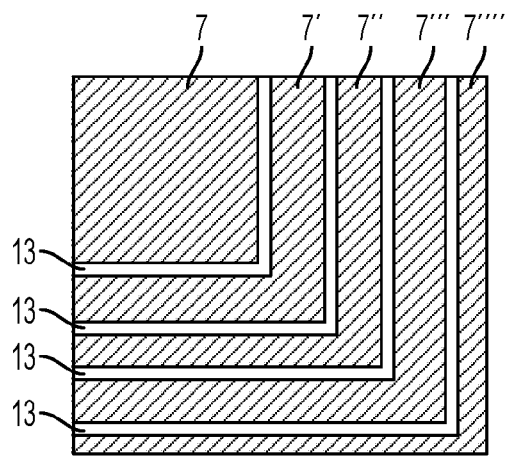
Figure 11:
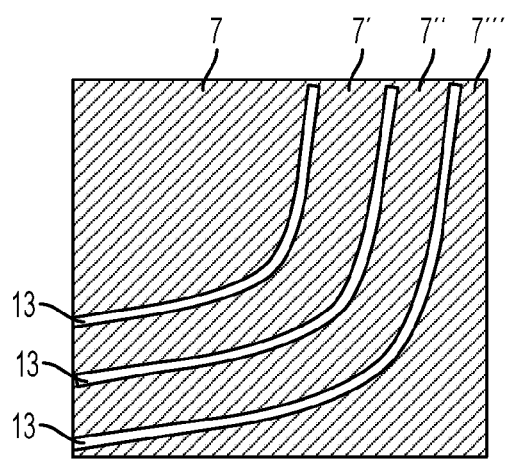

FIG. 8 shows an electrode configuration in which the picture element area has been divided into four parts 7,7', 7", 7''' having a certain area ratio and are driven by voltages V1, V2, V3, V4. FIG. 9 shows an electrode configuration in which the picture element area has been divided into three parts 7,7', 7" having another area ratio and are driven by voltages V1, V2 and V3. FIG. 10 shows an electrode configuration having a central picture element area 7 being enclosed by successive picture element area parts 7', 7", 7'''. The parts do not necessarily have to be square or rectangular, as shown in FIG. 11. FIGS. 8-11 have the intermediate layer 8 removed for clarity.

Several variations to the principle are possible. Although a reflective device has been described, the display may be made transmissive. Also the height of the walls 13 may be varied and said wall may have for instance a curved surface. Modifying the height will modify the curvature of the oil in the fixed states, so it will influence the required voltages and the stability of the states. If the material of the barriers 13 is the same as the material used for the pixel walls 2 they are equally hydrophilic as the pixel wall, and now the height of the barrier 13 (which is always lower than the pixel wall and may even be zero, which possibly requires a rather strong hydrophilicity at the position of dividing sub-picture elements, possibly even stronger than the one of the pixel wall 2) is the parameter determining the picture element dynamics. In this case, the volume of the oil compared to the picture element size will play an important role. There should be sufficient oil to make the oil fill the whole picture element, i.e. cross the lower barrier in case both electrodes are switched to a high voltage.

The invention resides in each and every novel characteristic feature and each and every combination of characteristic features. Reference numerals in the claims do not limit their protective scope. Use of the verb "to comprise" and its conjugations does not exclude the presence of elements other than those stated in the claims. Use of the article "a" or "an" preceding an element does not exclude the presence of a plurality of such elements.

The invention claimed is:

1. A display device comprising picture elements separated by picture walls, each picture element having at least a first fluid and a second fluid immiscible with each other within a space between a first support plate and a second support plate, the second fluid being electroconductive or polar, the picture elements each comprising at least one barrier separating the picture element to define sub-picture elements, the display device further comprising electrodes separated from each other along the barriers to provide an electrode for each sub-picture element, the barriers during operation allowing transfer of the first fluid within the picture element between a first sub-picture element and a second sub-picture element for moving the first fluid across the barrier away from a first picture area controlled by a first electrode of the first sub-picture element, to a second picture area controlled by a second electrode of the second sub-picture element.

2. The display device according to claim 1 in which during operation a voltage source supplies voltages to electrodes for the sub-picture elements.

3. The display device according to claim 1, wherein the first fluid comprises an oil and the second fluid comprises water, wherein an intermediate layer over the first electrode of the first sub-picture element is hydrophobic and is separated from the second sub-picture element by a hydrophilic wall, and wherein the hydrophilic wall is more hydrophilic with respect to the intermediate layer over the first electrode of the first sub-picture element.

4. The display device according to claim 1, wherein the first fluid comprises an oil and the second fluid comprises water, and wherein the barriers comprise more hydrophilic surfaces provided on barrier walls than surface areas of the first sub-picture element and the second sub-picture element.

5. The display device according to claim 1, wherein picture areas are separated by picture walls which are higher than barrier walls of the barriers separating the sub-picture elements.

6. The display device according to claim 1, wherein barrier walls of the barriers are more hydrophilic than picture walls separating picture areas.

7. The display device according to claim 1 wherein the first fluid comprises an oil and the second fluid comprises water, wherein, during operation, a pulsed high voltage is applied to one of the electrodes of the sub-picture elements by a voltage source, and wherein the pulse is shorter than a time required for the oil to move across the barrier entirely.

8. An optical switch comprising:
   a first support plate and a second support plate;
   at least one first fluid and a second fluid immiscible with each other within a space between the first support plate and the second support plate, the second fluid being electroconductive or polar;
   barriers located on the first support plate, the barriers separating the space to define sub-elements, the optical switch further comprising electrodes separated from each other along the barriers to provide an electrode for each sub-element of the sub-elements, wherein the barriers during operation are configured to allow transfer of the first fluid within said space between a first sub-element and a second sub-element for moving the first fluid across the barrier away from a first picture area controlled by an electrode of the first sub-element, to a second picture area controlled by an electrode the second sub-element.

9. The optical switch according to claim 8 in which during operation a voltage device supplies voltages to the electrode of the first sub-element and the electrode of the second sub-element.

10. The optical switch according to claim 8, wherein a first area of the first sub-element has a first wettability to the second fluid and is separated from the second sub-element by a second area having a second wettability to the second fluid, wherein the second wettability is more than the first wettability.

11. The optical switch according to claim 8 in which the barriers comprise more wettable surfaces provided on barrier walls than surface areas of the first sub-element and the second sub-element.

12. The optical switch according to claim 8, wherein the first fluid comprises an oil, and wherein during operation, a pulsed high voltage is applied to an electrode of one of the first sub-element and the second sub-element by a voltage device, the pulse being shorter than a time required for the oil to move across the barrier entirely.

13. An optical switch comprising:
   a first support plate and a second support plate;
   pixel walls between the first support plate and the second support plate, wherein the pixel walls, the first support plate and the second support plate define a space;
   a first fluid and a second fluid located within the space, wherein the first fluid is immiscible with the second fluid; and
   a barrier located on the first support plate, the barrier separating the space to define a first sub-element and a second sub-element which are individually addressable by a first electrode and a second electrode, respectively, wherein the first electrode is separated from the second electrode along the barrier;
   wherein the barrier during operation is configured to allow transfer of the first fluid within said space between the first sub-picture element and the second sub-picture element for moving the first fluid across the barrier away from a first picture area controlled by the first electrode, to a second picture area controlled by the second electrode.

14. The optical switch of claim 13, wherein the pixel walls and the barrier are hydrophilic, and wherein the barrier is less hydrophilic than the pixel walls.

15. The optical switch of claim 13, wherein the first fluid comprises an oil, and the barrier is hydrophilic to prevent the oil from wetting the barrier.

16. The optical switch of claim 13, wherein a top surface of the barrier is more hydrophilic than side surfaces of the barrier.

* * * * *